US011408529B2

United States Patent
Schmitt et al.

(10) Patent No.: US 11,408,529 B2
(45) Date of Patent: Aug. 9, 2022

(54) EXHAUST FLAP

(71) Applicant: Eberspächer Exhaust Technology GmbH, Neunkirchen (DE)

(72) Inventors: Steffen Schmitt, Ostfildern (DE); Annika Zeumer, Wernau (DE); Andreas Wacker, Plochingen (DE)

(73) Assignee: PUREM GMBH, Neunkirchen (DE)

(*) Notice: Subject to any disclaimer, the term of this patent is extended or adjusted under 35 U.S.C. 154(b) by 93 days.

(21) Appl. No.: 16/787,927

(22) Filed: Feb. 11, 2020

(65) Prior Publication Data

US 2020/0256477 A1 Aug. 13, 2020

(30) Foreign Application Priority Data

Feb. 13, 2019 (DE) ...................... 10 2019 103 556.2

(51) Int. Cl.
*F16K 31/04* (2006.01)
*F02M 26/70* (2016.01)
*F16K 1/22* (2006.01)

(52) U.S. Cl.
CPC ........... *F16K 31/043* (2013.01); *F02M 26/70* (2016.02); *F16K 1/221* (2013.01)

(58) Field of Classification Search
CPC ......... F02D 9/1065; F16D 3/06; F02M 26/70; F16K 31/043; F16K 1/221

(Continued)

(56) References Cited

U.S. PATENT DOCUMENTS 5,429,090 A * 7/1995 Kotchi ................. F02D 9/02
123/396
6,079,390 A * 6/2000 Hashimoto ............... F02D 9/02
123/396

(Continued)

FOREIGN PATENT DOCUMENTS

DE 102011107088 A1 * 1/2013 ............. F16K 1/221
DE 102011107088 A1 1/2013

(Continued)

OTHER PUBLICATIONS https://www.dictionary.com/browse/mesh, retrieved Dec. 21, 2021. (Year: 2021).*

(Continued)

*Primary Examiner* — Seth W. Mackay-Smith
(74) *Attorney, Agent, or Firm* — McGlew and Tuttle, P.C.

(57) ABSTRACT

A coupling device couples a drive shaft of a pivot drive (30) of an exhaust gas stream exhaust flap (10) for an internal combustion engine with a pivot shaft (14), which is rotatable about a pivot axis (A) and carries a flap member (16). The coupling device includes a coupling element (46) with a first coupling area (42) positive-locking engaging with a drive shaft (34) and with a second coupling area (44) positive-locking engaging with a pivot shaft. A prestressing element (58) is supported in relation to the coupling element and in relation to a support element (66) and prestresses the coupling element in a direction of a coupling axis (K), axially away from the support element and in a circumferential direction. A preassembly-blocking device (78) holds the support element under axial prestress and circumferential prestress in a preassembled position in relation to the coupling element.

20 Claims, 3 Drawing Sheets

(58) Field of Classification Search
USPC .................................................. 251/305, 308
See application file for complete search history.

(56) References Cited

U.S. PATENT DOCUMENTS

| | | | | |
|---|---|---|---|---|
| 6,382,181 | B2* | 5/2002 | Wayama | F02D 9/1065 |
| | | | | 123/337 |
| 7,971,578 | B2* | 7/2011 | Lim | F02M 26/70 |
| | | | | 123/568.17 |
| 10,060,360 | B2* | 8/2018 | Delplanque | F02D 9/1065 |
| 10,450,969 | B2* | 10/2019 | Stark | F16K 31/047 |
| 10,480,659 | B2* | 11/2019 | Schmitt | F16K 31/043 |
| 10,927,797 | B2* | 2/2021 | Oblinger | F16K 1/221 |
| 2017/0138274 | A1* | 5/2017 | Stark | F02D 9/1065 |
| 2017/0284310 | A1* | 10/2017 | Delplanque | F02D 9/107 |
| 2018/0128381 | A1* | 5/2018 | Schmitt | F02D 9/06 |
| 2019/0170092 | A1* | 6/2019 | Oblinger | F02D 9/04 |
| 2020/0362969 | A1* | 11/2020 | Tanaka | F16K 27/0218 |

FOREIGN PATENT DOCUMENTS

| | | | |
|---|---|---|---|
| DE | 102014017523 A1 | 6/2015 | |
| DE | 102015202211 A1 | 8/2016 | |
| DE | 102016203794 A1 | 9/2017 | |
| DE | 102016114704 A1 | 1/2018 | |
| EP | 2085601 B1 * | 5/2011 | ............. F02M 26/70 |
| WO | WO-2015078432 A1 * | 6/2015 | ................ F02D 9/04 |

OTHER PUBLICATIONS https://www.dictionary.com/browse/diaphragm retrieved Dec. 21, 2021. (Year: 2021).*

* cited by examiner

EXHAUST FLAP

CROSS REFERENCE TO RELATED APPLICATIONS

This application claims the benefit of priority under 35 U.S.C. § 119 of German Application 10 2019 103 556.2, filed Feb. 13, 2019, the entire contents of which are incorporated herein by reference.

TECHNICAL FIELD

The present invention pertains to a coupling device for coupling a drive shaft of a pivot drive of an exhaust flap for the exhaust gas stream of an internal combustion engine with a pivot shaft, which is rotatable about a pivot axis and carries a flap member.

TECHNICAL BACKGROUND

An exhaust flap is known from DE 10 2016 114 704 A1. This exhaust flap comprises a flap tube, which is to be integrated into an exhaust system and which has a, for example, circular cross section and provides a housing for a flap member carried rotatably about a pivot axis on a pivot shaft. A pivoting drive for the flap member is carried at the flap tube via a carrier structure. The pivoting drive comprises an electric motor accommodated in a housing. A drive shaft of the pivoting drive, which drive shaft projects from the housing, is coupled with the pivot shaft via a coupling device for joint rotation with the pivot shaft and can thus rotate the flap member about the pivot axis when the electric motor is energized.

The coupling device comprises two coupling elements bent, for example, from spring steel sheet or the like. One coupling element provides a first coupling area, in which the coupling device is in a rotary coupling positive-locking engaging state with the drive shaft. The other coupling element provides a second coupling area, in which the coupling device is in a rotary coupling positive-locking engaging state with the pivot shaft. The two coupling elements further engage with one another in their two areas that are located radially on the outside in relation to the pivot axis and they thus engage in this manner with one another in a rotary coupling positive-locking engaging state and are axially supported in relation to one another, so that the pivot shaft is prestressed in the direction away from the drive shaft via this axial support and via the prestress generated thereby and it is thus held in a defined position in the axial direction in relation to the pivot axis.

SUMMARY

An object of the present invention is to provide a coupling device for coupling a drive shaft of a flap drive of an exhaust flap for the exhaust gas stream of an internal combustion engine with a pivot shaft, which is rotatable about a pivot axis and carries a flap member in which a defined positioning of the drive shaft in relation to the pivot shaft is guaranteed along with good thermal uncoupling.

This object is accomplished according to the present invention by a coupling device for coupling a drive shaft of a pivot drive of an exhaust flap for the exhaust gas stream of an internal combustion engine with a pivot shaft, which is rotatable about a pivot axis and carries a flap member, comprising:

- a coupling element with a first coupling area, which is to be brought into a rotary coupling positive-locking engaging state with a drive shaft, and with a second coupling area, which is to be brought into a rotary coupling positive-locking engaging state with a pivot shaft,
- a prestressing element, which is supported in relation to the coupling element and in relation to a support element, wherein the coupling element is prestressed by the prestressing element in the direction of a coupling axis axially away from the support element and in the circumferential direction, and
- at least one preassembly-blocking device for holding the support element under axial prestress and circumferential prestress in a preassembled position in relation to the coupling element.

This coupling device according to the present invention is characterized by a prestressing element being supported in relation to the drive shaft of a flap drive, on the hand, and to the pivot shaft, on the other hand, wherein the coupling device is axially prestressed by the prestressing element in the installed state in the direction of the pivot axis of the pivot shaft and also of the coupling axis and the drive shaft and the pivot shaft are prestressed in relation to one another about the pivot axis and the coupling axis in the circumferential direction. A contact between the two shafts and the coupling device, which contributes to the heat transfer, is present essentially only in the area of the coupling element, as a result of which good thermal uncoupling is guaranteed. On the other hand, the provision of the preassembly-blocking device makes possible a simple assembly of the coupling device with one of the two shafts, especially the pivot shaft, before a connection is then established with the other of the two shafts, especially with the derive shaft.

A reliably acting prestress may be provided, for example, by the prestressing element comprising a coil spring preferably with a plurality of turns.

For a stable connection, the prestressing element may be permanently (fixedly) coupled with the coupling element in a first connection area and it may be coupled permanently (fixedly) to the support element in a second connection area.

This may be achieved, for example, by the first connection area comprising a first turn end section extending in a first axial end area of the prestressing element and by the second connection area comprising a second turn end section extending in a second axial end area of the prestressing element.

For a reliable coupling with the two shafts, the coupling element may have an essentially plate-like (plate-shaped) configuration in the first coupling area and in the second coupling area. As an alternative or in addition, the coupling element may have coupling element end areas arranged overlapping one another in at least one of the coupling areas. This makes it possible to bend the coupling element from a sheet metal strip, preferably spring steel.

The at least one preassembly-blocking device may comprise a blocking attachment at an element (first element) of coupling element and support element and may comprise at the other element (second element) of coupling element and support element a blocking arm with an axial blocking area, which extends over the blocking attachment on the side facing away from the other element of coupling element and support element and acting on same in a preassembly-blocking state, and with a circumferential blocking area, which is located opposite the blocking attachment in the circumferential direction and is in contact with it in the preassembly-blocking state.

A reliable interaction between the blocking attachment and the blocking arm may be achieved here, for example, by the blocking attachment projecting radially outwards from the one element of coupling element and support element in relation to the coupling axis, or/and by the blocking arm extending from the other element of coupling element and support element essentially axially towards the one element of coupling element and support element.

To make it possible to guarantee a prestressing of the two shafts to be coupled in the operating state, it is proposed that a release area set back away from the blocking attachment in the circumferential direction be provided at the blocking arm. For example, the release area may comprise a release recess.

In order to ensure that the blocking effect in the circumferential direction is abolished when an axial compression is introduced, provisions may be made according to the present invention for the circumferential blocking area to be arranged in the direction of the coupling axis between the release area and the axial blocking area.

The one element is preferably the coupling element, and the other element is preferably the support element.

The present invention further pertains to an exhaust flap preassembled assembly unit, comprising a flap tube, a flap member carried on a pivot shaft rotatable about a pivot axis in the interior of the flap tube, as well as a coupling device configured according to the present invention, which is fixed to the pivot shaft.

In such an exhaust flap preassembled assembly unit, the support element and the coupling element are blocked in relation to one another in a preassembled state, so that the two shafts coupled with one another are prestressed both axially and in the circumferential direction in relation to one another during the subsequent fitting together with a flap drive by releasing the blocking attachment during axial compression of the coupling device.

Provisions may be made in this connection, for example, for the coupling device to be fixed with its second coupling area at the pivot shaft, and for the coupling device to have in the second coupling area a second positive-locking engaging opening with an engaging opening cross-sectional geometry and for the pivot shaft to have a positive-locking engaging end engaging with the second positive-locking engaging opening with an engaging end cross-sectional geometry complementary to the engaging opening cross-sectional geometry of the second positive-locking engaging opening.

For a stable connection, it is proposed that the coupling device be fixed at the pivot shaft by connection in substance.

The present invention further pertains to an exhaust flap for the exhaust gas stream of an internal combustion engine, comprising a flap tube, a flap member carried on a pivot shaft rotatable about a pivot axis in the interior of the flap tube, a pivot drive for the pivot shaft as well as a coupling device having the configuration according to the present invention, which couples the pivot axis with a drive shaft of the pivot drive for joint rotation about the pivot axis. Provisions may be made in this connection, for example, for an exhaust flap preassembled assembly unit containing the coupling device to be fitted together with a flap drive for building the exhaust flap.

To guarantee a prestressing of the two shafts coupled with one another, it is proposed that the prestressing element be supported axially and in the circumferential direction at one shaft of the drive shaft and pivot shaft via the support element and that the prestressing element be supported axially via the coupling element at the other shaft of the drive shaft and pivot shaft.

Further, the blocking attachment is out of blocking engaging with the axial blocking area and with the circumferential blocking area of the blocking arm to obtain the prestressing of the two shafts in both the circumferential direction and in the axial direction in relation to one another.

It is proposed for a stable and accurate coupling of the coupling device with the two shafts that the coupling device have a first positive-locking engaging opening with an engaging opening cross-sectional geometry in the first coupling area and that the drive shaft have a positive-locking engaging end engaging with the first positive-locking engaging opening with an engaging end cross-sectional geometry complementary to the engaging opening cross-sectional geometry of the first positive-locking engaging opening, or/and that the coupling device have in the second coupling area a second positive-locking engaging opening with an engaging opening cross-sectional geometry and that the pivot shaft have a positive-locking engaging end engaging with the second positive-locking engaging opening with an engaging end cross-sectional geometry complementary to the engaging opening cross-sectional geometry of the second positive-locking engaging opening.

In order to generate a circumferential prestressing between the pivot shaft and the drive shaft and to make it possible to transmit it via the support element, it is necessary likewise to provide a circumferential positive-locking connection between the support element and the shaft interacting with this, i.e., for example, with the drive shaft. It is proposed for this purpose that the support element have a positive-locking engaging opening with an engaging opening cross-sectional geometry and that the drive shaft have a positive-locking engaging end engaging with the positive-locking engaging opening of the support element with an engaging end cross-sectional geometry complementary to the engaging opening cross-sectional geometry of the positive-locking engaging opening.

The assembly of an exhaust flap configured according to the present invention cam be simplified by the positive-locking engaging end of the drive shaft being configured cylindrically in the direction of the pivot axis. Further, the coupling device may be carried on the pivot shaft secured against detachment.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
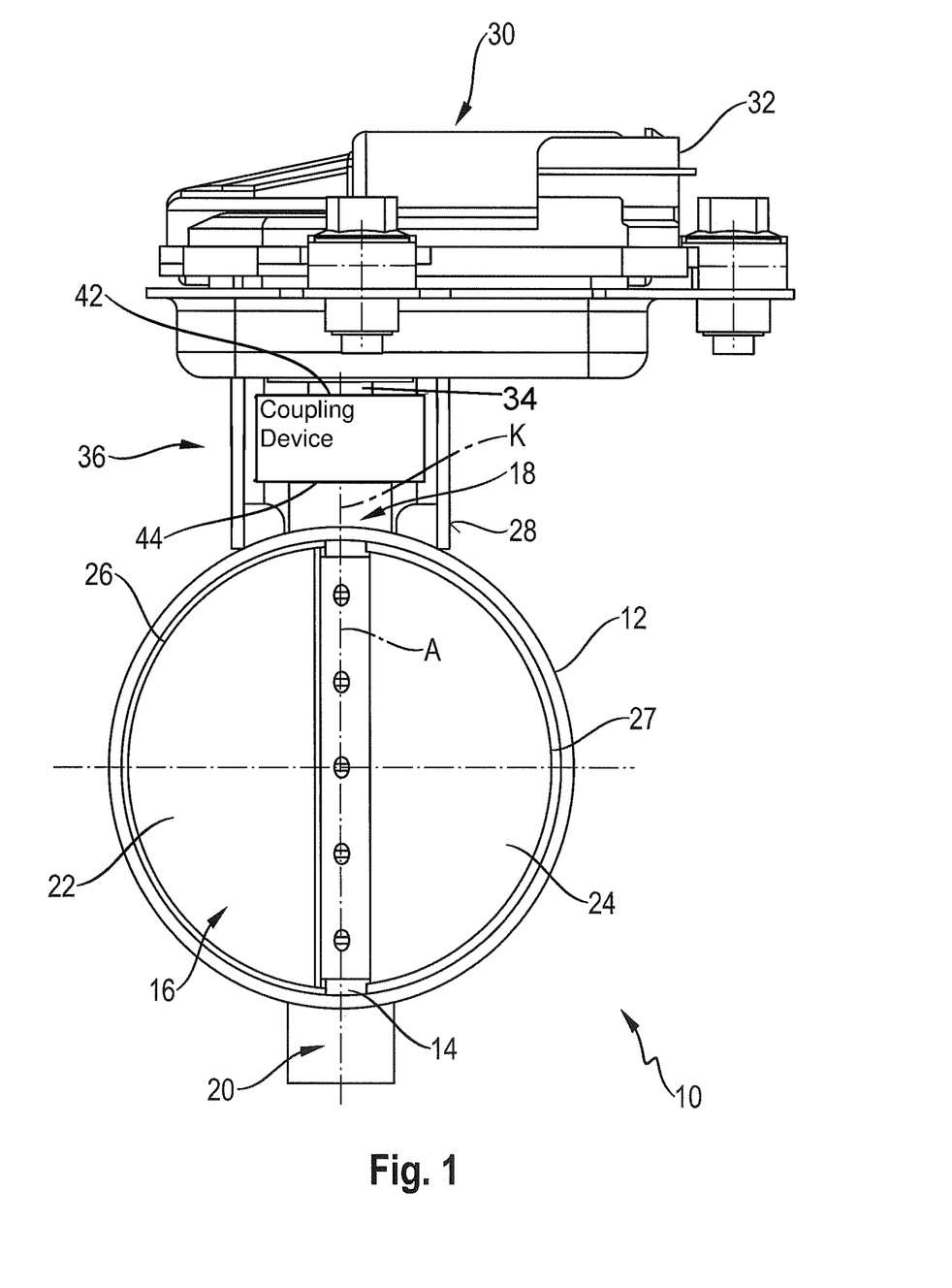
FIG. 1 is a side view of an exhaust flap.

Referring to the drawings, an exhaust flap 10, shown in FIG. 1, comprises a flap tube 12, which is to be integrated into an exhaust system. The flap tube 12 has a circular cross section and provides a housing for a flap member 16 carried rotatably about a pivot axis A on a pivot shaft 14. The pivot shaft 14 is carried, at pivot shaft end areas projecting from the exhaust gas pipe 12 at respective mounting attachments 18 and 20, rotatably about the pivot axis A. The flap member 16 provided at the pivot shaft 14 has two member wings 22, 24, which are in contact with respective wing stops 26, 27 at the inner circumference of the flap tube 12 in the closed position of the flap member, which is shown n FIG. 1. The two member wings 22, 24 essentially block the exhaust gas flow path through the flap tube 12. When rotating the flap member 16 about the pivot axis A starting from the closed state shown in FIG. 1 by, for example, about 90°, the two flap wings 22, 24 are aligned essentially parallel to the exhaust gas flow direction, so that exhaust gas can flow essentially unhindered through the flap tube 12.

A pivoting drive 30 for the flap member 16 is carried at the flap tube 12 via a carrier structure 28. The pivoting drive 30 comprises an electric motor accommodated in a housing 32. A drive shaft 34 of the pivoting drive 30 projects from the housing 32. The drive shaft 34 is coupled with the pivot shaft 14 via a coupling device generally designated by 36 for joint rotation with the pivot shaft 14. The drive shaft 34 can thus rotate the flap member 16 about the pivot axis A when the electric motor is energized.

Figure 2:
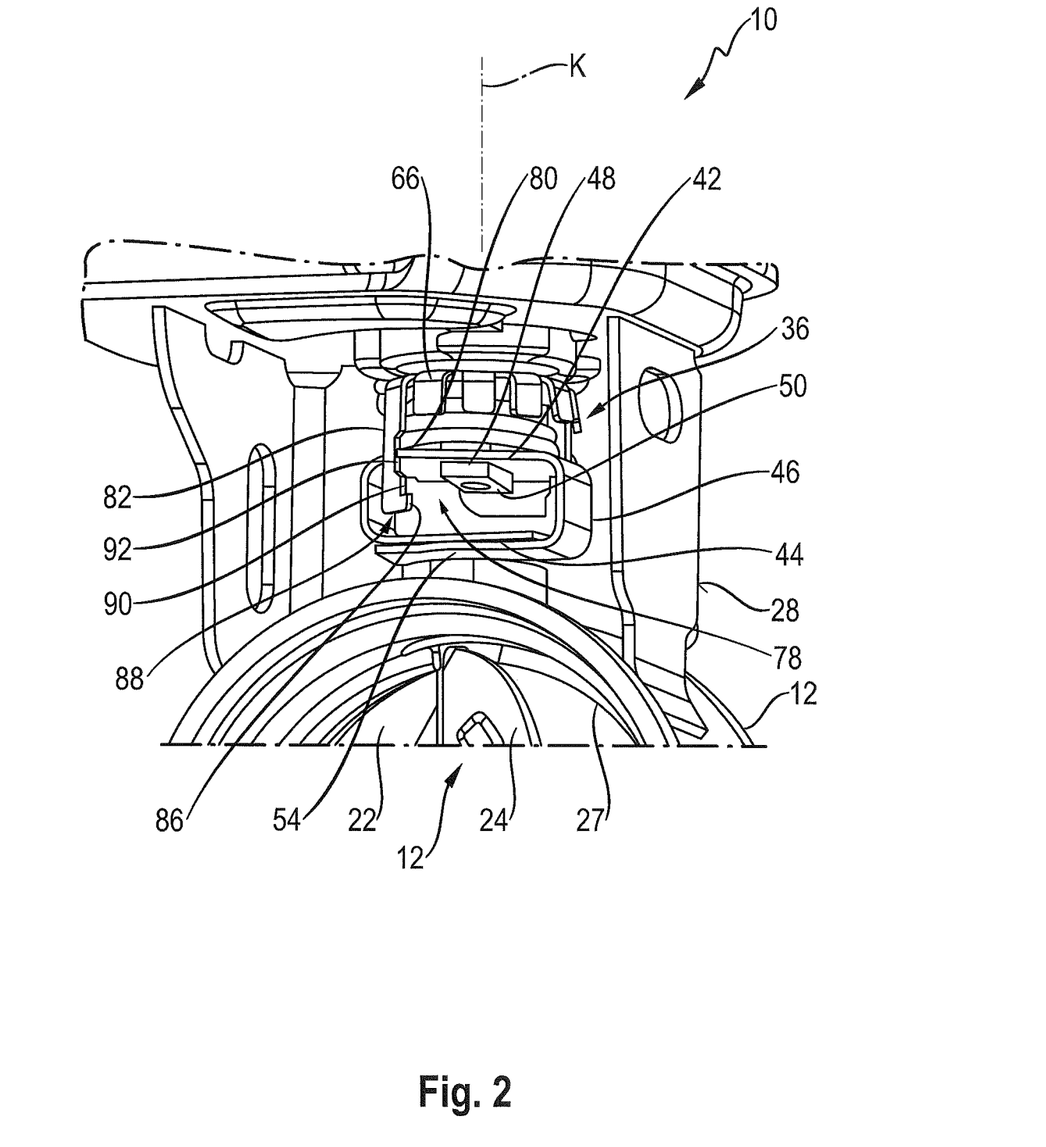
FIG. 2 is a perspective view of the coupling of a drive shaft of a pivot drive of an exhaust flap with a pivot shaft of an exhaust flap, which coupling is configured according to the present invention.
Figure 3:
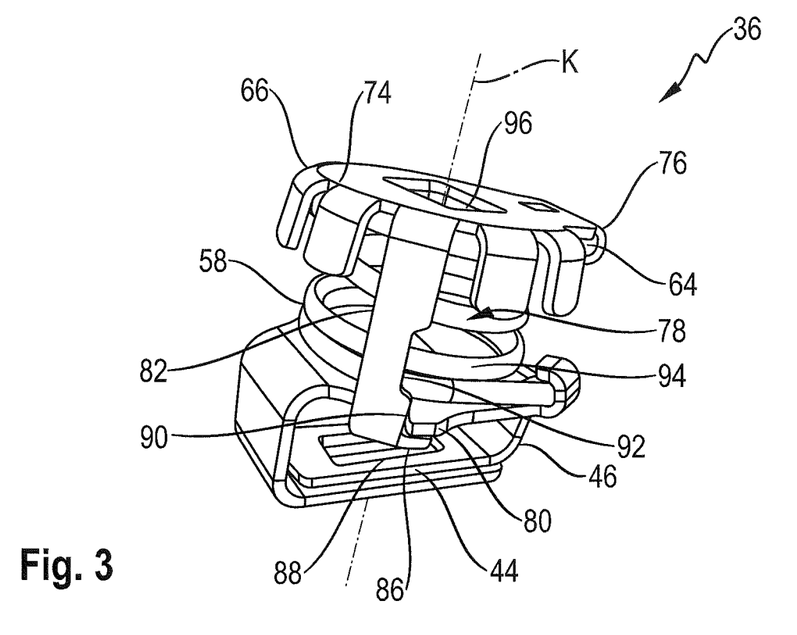
FIG. 3 is a perspective view of a coupling device for an exhaust flap in a preassembly-blocking state.
Figure 4:
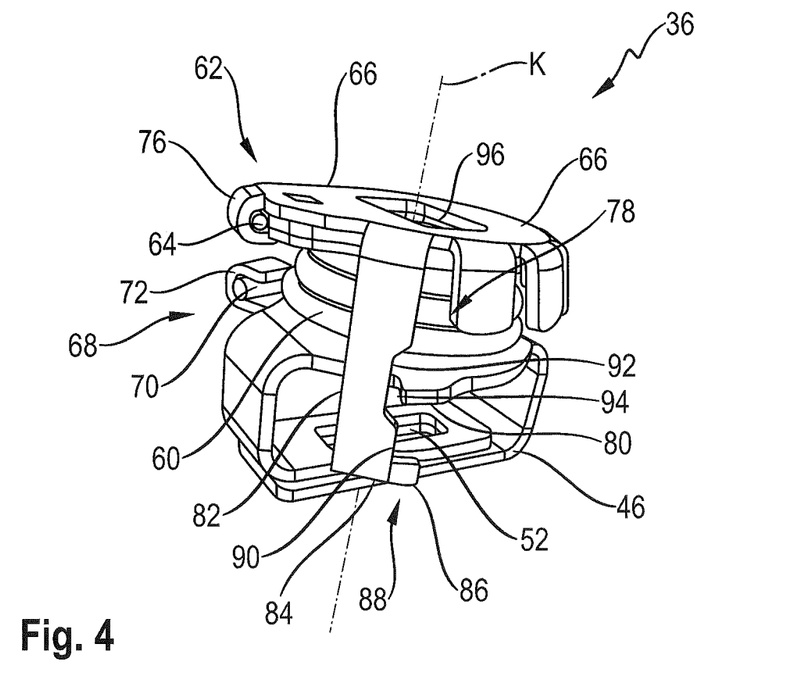
FIG. 4 is a perspective view, corresponding to FIG. 3, of a coupling device with the blocking effect abolished, viewed from another perspective.

FIGS. 2 through 4 show an approximately box-like coupling element 46 of the coupling device 36, which box-like coupling element 46 may be bent, for example, from a sheet metal strip. The coupling element 46 provides, in a first plate-shaped area, the first coupling area 42 and, in a second plate-shaped area formed by mutually overlapping ends, the second coupling area 44. In the first coupling area 42, the coupling element 46 has a first positive-locking engaging opening 48, with which a positive-locking engaging end 50 of the drive shaft 34 engages. The first positive-locking engaging opening 48 has a, for example, engaging opening cross-sectional geometry having an elongated hole-like configuration, to which an engaging end cross-sectional geometry of the positive-locking engaging end 50 of the drive shaft 34 is complementary. For example, the two cross-sectional geometries may have a polygonal, for example, essentially rectangular configuration. The positive-locking engaging end 50 of the drive shaft 34 is of an essentially cylindrical shape, i.e., it has a cross-sectional geometry and cross-sectional dimension that do not essentially change in the axial direction in its length area interacting with the coupling element 46.

A second positive-locking engaging opening 52, with which a positive-locking engaging end 54 of the pivot shaft 14 engages, is formed in a corresponding manner in the second coupling area 44. An engaging opening cross-sectional geometry of the second positive-locking engaging opening 52 and an engaging end cross-sectional geometry of the positive-locking engaging end 54 of the pivot shaft 14 may be complementary to one another here as well, so that the pivot shaft 14 with the pivot shaft positive-locking engaging end 54 can engage with the second positive-locking engaging opening 52 essentially without clearance. This may then be supported by the fact that the positive-locking engaging end 54 has a tapering configuration in the direction of its free end, i.e., in the direction of the drive shaft 34.

A prestressing element 58 is configured as a compression coil spring and has a plurality of turns 60 enclosing the pivot shaft A, which also corresponds to a coupling axis K. In an axial end area 62 located at a distance from the coupling element 46, the prestressing element 58 has a first connection area, which is provided, for example, by a turn end section 64 thereof, in which the prestressing element 58 is fixed at a support element 66 having a cup-like or pot-like shape. In a second axial end area 68, the prestressing element 58 has a second connection area, which is provided, for example, by a second turn end section 70, and in which the prestressing element 58 is fixed at the support element 66. A fastening strap 72, which is placed around the turn end section 70 and clamps this firmly by pressing, may be provided for this purpose at the support element 66 in the area of the first coupling area 42. Projecting from a bottom area 74 of the support element 66, a connection strap 76, which encloses the first turn end section 74 and clamps same firmly by pressing, may be provided in a corresponding manner at said support element 66.

Two preassembly-blocking devices 78 positioned at mutually opposite circumferential areas act between the support element 66 and the coupling element 46. Each preassembly-blocking device 78 comprises at the coupling element 46, especially at the first coupling area 42 thereof, a radially outwards projecting blocking attachment 80. In association with the blocking attachment 80, each preassembly-blocking device 78 comprises at the support element 66 a blocking arm 82 extending from these essentially in the direction of the coupling axis K to the coupling element 46. At a blocking arm end area 84 located at a distance from the support element 66, the blocking arm 82 has an axial blocking projection 86, which projects in the circumferential direction and which forms an axial blocking area 88. With the axial blocking area 88, the blocking arm 82 extends over the blocking attachment 80 on a blocking attachment side facing away from the support element 66 in the circumferential direction and thus extends behind the blocking attachment 80 in the axial direction. The blocking attachment 80 is axially prestressed against the axial blocking projection 86 and is thus held at same by the prestressing element 58 maintained in the assembled state or in a preassembly-blocking state.

A circumferential blocking area 90 is provided at the blocking arm 82, axially adjoins the axial blocking projection 86. The circumferential blocking area 90 is located opposite the blocking attachment 80 in the circumferential direction and is kept in contact with the blocking attachment 80 by the prestressing of the prestressing element 58. In the preassembly-blocking state, the prestressing element 88 is not only held axially compressed, but is also braced in the circumferential direction, so that a defined support of the axial blocking area 88 and of the circumferential blocking area 90 at the blocking attachment 80 is guaranteed.

Axially adjoining the circumferential blocking area 90, a release area 94 provided with a release recess 92 is provided at the blocking arm 82. The blocking arm 82 is set back in this release area 94 in relation to the circumferential blocking area 90 in the circumferential direction away from the blocking attachment 80. With the coupling device 36 held in the preassembly-blocking state, the blocking attachment 82 is supported at the circumferential blocking area 90 located axially between the axial blocking area 88 and the release area 94. If the support element 66 is displaced axially towards the coupling element 46, the blocking attachment 80 axially enters into the area of the release recess 92. If the coupling element 46 and the support element 66 could perform a relative circumferential rotation in relation to one another under the prestressing of the prestressing element 58, the blocking attachment 80 would enter into the release recess 92 and be supported in the area of the release recess 92 at the blocking arm 82.

To build an exhaust flap, an exhaust flap preassembled assembly unit, which comprises essentially the coupling device 36 according to FIGS. 3 and 4 and the flap tube 12 with the pivot shaft 14, which is carried thereon rotatably and which carries the flap member 16, may first be provided. The pivot drive 30 with a drive shaft 34 is not yet coupled with a drive shaft 34 in this state.

To manufacture this exhaust flap preassembled assembly unit, the coupling device 36 held in the preassembly-blocking state shown in FIG. 3 is first fixed at the pivot shaft 14 or at the positive-locking engaging end 54 thereof. The second coupling area 44 is pushed for this purpose with the positive-locking engaging opening 52 formed therein onto the positive-locking engaging end 54 of the pivot shaft 14 and is fixed thereto preferably by connection in substance, for example, by welding or soldering. A frictionally engaged connection may also be prepared, in principle, for example, by pressing on.

The preassembled assembly unit provided in this manner is subsequently mounted with the pivot drive 30. The pivot drive 30 is moved to the flap tube 12 such that the positive-locking engaging end 50 is inserted from drive shaft 34 through an opening 96 forming a positive-locking engaging opening in the support element 66 into the first positive-locking engaging opening 48 in the first coupling area 42 of the coupling element 46. The contour of the opening 96 also corresponds essentially to the contour of the positive-locking engaging opening 48 in the first coupling area 42, so that a rotary coupling or a circumferential support also develops between the support element 66 and the positive-locking engaging end 50 of the drive shaft 34.

In the course of this movement, the support element 66 is supported axially at radial projection areas of the drive shaft 34. A longer-lasting axial movement of the pivot drive 30 towards the flap tube 12 causes the support element 66 to be displaced against the prestressing of the pressing element 58 towards the coupling element 36 fixed at the pivot shaft 14. The blocking attachment 80 is displaced, in the process, at each preassembly-blocking device 78, axially along the circumferential blocking area 90. The blocking attachment 80 enters the axial area of the release area 94. In this state shown in FIG. 4, the coupling element 46 is no longer supported via the blocking attachments 80 in the circumferential direction at the blocking arms 82. The circumferential prestressing generated by the prestressing element 58 then acts between the two shafts 34, 14 so that a slight circumferential clearance of motion possibly present between the two shafts 34, 14 and the associated positive-locking engaging openings 48, 52 is eliminated and these two shafts 34, 34 are held in a defined circumferential positioning in relation to one another. In the course of this elimination of a circumferential clearance of motion, a particular blocking attachment 80 may enter slightly into the release recess 92 associated with it in the circumferential direction, but blocking attachment 80 does not come into contact with the blocking arm 82 in the process.

The permanent (fixed) connection of the carrier structure 28 with the pivot drive 30 may take place, for example, by a positive-locking engaging in the manner of a quarter-turn fastener or/and by connection in substance, i.e., for example, by welding.

Due to the prestressing element 58 configured as a compression coil spring in the exemplary embodiment shown, a defined circumferential relative positioning is thus forced, on the one hand, between the drive shaft 34 and the coupling element 46, so that no backlash can occur between the drive shaft 34 and the coupling element 46 during rotation of the drive shaft 34. At the same time, a defined positioning of the pivot shaft 14 in the flap tube 12 in the direction of the pivot axis A is forced by the axial prestress generated by means of the prestressing element 58.

With the configuration according to the present invention of the coupling between the drive shaft 34 and the pivot shaft 14, a defined relative positioning of these two shafts is forced, so that a clearance of motion of the two shafts 34, 14 leading to undefined positionings of the flap member 16 in relation to one another cannot occur. At the same time, a contact between the two shafts 14, 34, which leads to heat transfer, is limited essentially to the area in which the coupling element 46 touches the pivot shaft 14 and the drive shaft 34, as well as to the area in which the support element 66 touches the drive shaft 34, as a result of which very good thermal uncoupling is achieved with high mechanical strength of the assembly unit intended for the coupling and also with good resistance to external effects, especially against corrosion. Further, the uncoupling of the motions of the two shafts 14, 34 in relation to one another, which uncoupling is present in the direction of the pivot axis, makes possible heat-induced relative movements, without constraints developing in any mounting areas, and the compensation of component tolerances as well as also of assembly tolerances occurring in the manufacturing process.

It should finally be pointed out that it is, of course, also possible to embody a configuration in which the prestressing element acts between the pivot shaft 14 and the element 46. The particular shape of the ends of the two shafts 34, 14, which ends are positioned facing one another, would then be able to be replaced with one another, so that the coupling element 46 and with this the prestressing element 58 and the support element 66 are preassembled with the drive shaft 34 in a preassembled state and the pivot shaft 34 is then brought during the final assembly into positive-locking engaging with the coupling element 46 and with the support element 66. Further, it should be pointed out that, for example, the pivot shaft 14 may have a multipart configuration and may have a shaft section carried pivotably at the flap tube 12 and carrying the member wings 22, 24 as well as a shaft section that provides the positive-locking engaging end 54 and is configured as a separate component. As an alternative, the pivot shaft 14 may, of course, have a one-part configuration with all functional sections thereof.

While specific embodiments of the invention have been shown and described in detail to illustrate the application of the principles of the invention, it will be understood that the invention may be embodied otherwise without departing from such principles.

What is claimed is:

1. A coupling device for coupling a drive shaft of a pivot drive of an exhaust flap for the exhaust gas stream of an internal combustion engine with a pivot shaft rotatable about a pivot axis and carrying a flap member, the coupling device comprising:

a coupling element with a first coupling area to be brought into rotary coupling positive-locking engaging with the drive shaft and with a second coupling area to be brought into rotary coupling positive-locking engaging with the pivot shaft;
a support element, at least a portion of the support element being located at a spaced location from the coupling element;
a prestressing element supported in relation to the coupling element and supported in relation to the support element, wherein the coupling element is prestressed by the prestressing element in a direction of a coupling axis axially away from the support element and in a circumferential direction; and
a preassembly-blocking device for holding the support element under axial prestress and circumferential prestress in a preassembled position in relation to the coupling element.

2. A coupling device in accordance with claim 1, wherein the prestressing element comprises a coil spring.

3. A coupling device in accordance with claim 1, wherein the prestressing element is fixedly coupled to the coupling element in a first connection area and is fixedly coupled to the support element in a second connection area.

4. A coupling device in accordance with claim 3, wherein the first connection area comprises a first turn end section extending in a first axial end area of the prestressing element and that the second connection area comprises a second turn end section extending in a second axial end area of the prestressing element.

5. A coupling device in accordance with claim 1, wherein:
the coupling element has an essentially plate-shaped configuration in the first coupling area and in the second coupling area; or
in at least one of the coupling areas the coupling element has coupling element end areas arranged such that they overlap one another; or
the coupling element has an essentially plate-shaped configuration in the first coupling area and in the second coupling area and in at least one of the coupling areas the coupling element has coupling element end areas arranged such that they overlap one another.

6. A coupling device in accordance with claim 1, wherein the preassembly-blocking device comprises:
a blocking attachment at a first element comprised by one of the coupling element and the support element;
a blocking arm at a second element comprised by the other of the coupling element and the support element, the blocking arm having an axial blocking area and acting on the blocking attachment in a preassembly-blocking state and with a circumferential blocking area located opposite the blocking attachment in the circumferential direction and in contact with the blocking attachment in the preassembly-blocking state.

7. A coupling device in accordance with claim 6, wherein:
the blocking attachment projects radially outwards from the first element in relation to the coupling axis; or
the blocking arm extends from the second element essentially axially to the first element; or
the blocking attachment projects radially outwards from the first element in relation to the coupling axis and the blocking arm extends from the second element essentially axially to the first element.

8. A coupling device in accordance with claim 6, wherein the blocking arm provides a release area set back away from the blocking attachment in the circumferential direction in relation to the circumferential blocking area.

9. A coupling device in accordance with claim 8, wherein the release area comprises a release recess.

10. A coupling device in accordance with claim 7, wherein:
the blocking arm provides a release area set back away from the blocking attachment in the circumferential direction in relation to the circumferential blocking area; and
the circumferential blocking area is arranged in a direction of the coupling axis between the release area and the axial blocking area.

11. A coupling device in accordance with claim 6, wherein the first element is the coupling element and the second element is the support element.

12. An exhaust flap preassembled assembly unit, comprising:
a flap tube;
a flap member carried on a pivot shaft rotatable about a pivot axis in an interior of the flap tube; and
a coupling device comprising:
a coupling element with a first coupling area to be brought into rotary coupling positive-locking engaging with a drive shaft and with a second coupling area in rotary coupling positive-locking engaging with the pivot shaft;
a support element, at least a portion of the support element being located at a spaced location from the coupling element;
a prestressing element supported in relation to the coupling element and supported in relation to the support element, wherein the coupling element is prestressed by the prestressing element in a direction of a coupling axis axially away from the support element and in a circumferential direction; and
a preassembly-blocking device for holding the support element under axial prestress and circumferential prestress in a preassembled position in relation to the coupling element.

13. An exhaust flap preassembled assembly unit in accordance with claim 12, wherein:
the coupling device is fixed at the second coupling area to the pivot shaft;
the second coupling area of the coupling device has a positive-locking engaging opening with an engaging opening cross-sectional geometry; and
the pivot shaft has a positive-locking engaging end engaging with the positive-locking engaging opening with an engaging end cross-sectional geometry complementary to the engaging opening cross-sectional geometry of the positive-locking engaging opening.

14. An exhaust flap preassembled assembly unit in accordance with claim 12, wherein the coupling device is fixed at the pivot shaft by a connection in substance.

15. An exhaust flap valve for the exhaust gas stream of an internal combustion engine, the exhaust flap comprising:
a flap tube;
a flap member carried on a pivot shaft rotatable about a pivot axis in an interior of the flap tube;
a pivoting drive for the pivot shaft, the pivoting drive having a drive shaft; and
a coupling device coupling the pivot shaft with the drive shaft for joint rotation about the pivot axis, the coupling device comprising:
a coupling element with a first coupling area in rotary coupling positive-locking engaging with the drive shaft and with a second coupling area in rotary coupling positive-locking engaging with the pivot shaft;

a support element, at least a portion of the support element being located at a spaced location from the coupling element;

a prestressing element supported in relation to the coupling element and supported in relation to the support element, wherein the coupling element is prestressed by the prestressing element in a direction of a coupling axis axially away from the support element and in a circumferential direction; and a preassembly-blocking device for holding the support element under axial prestress and circumferential prestress in a preassembled position in relation to the coupling element.

16. An exhaust flap valve in accordance with claim 15, wherein the prestressing element is supported axially and in the circumferential direction via the support element at one of the drive shaft and the pivot shaft and the prestressing element is supported axially via the coupling element at the other shaft of the drive shaft and the pivot shaft.

17. An exhaust flap valve in accordance with claim 15, wherein the preassembly-blocking device comprises:

a blocking attachment at a first element comprised by one of the coupling element and the support element; and a blocking arm at a second element comprised by the other of the coupling element and the support element, the blocking arm having an axial blocking area and acting on blocking attachment in a preassembly-blocking state and with a circumferential blocking area located opposite the blocking attachment in the circumferential direction and in contact with the blocking attachment in the preassembly-blocking state and the blocking attachment is out of blocking engaging with the axial blocking area and with the circumferential blocking area of the blocking arm.

18. An exhaust flap valve in accordance with claim 15, wherein:

in the first coupling area the coupling device has a first positive-locking engaging opening with an engaging opening cross-sectional geometry and the drive shaft has a positive-locking engaging end engaging with the first positive-locking engaging opening by means of an engaging end cross-sectional geometry complementary to the engaging opening cross-sectional geometry of the first positive-locking engaging opening; or/and in the second coupling area the coupling device has a second positive-locking engaging opening with an engaging opening cross-sectional geometry and the pivot shaft has a positive-locking engaging end engaging with the second positive-locking engaging opening with an engaging end cross-sectional geometry complementary to the engaging opening cross-sectional geometry of the second positive-locking engaging opening; or/and the support element has a positive-locking engaging opening with an engaging opening cross-sectional geometry and the drive shaft has a positive-locking engaging end engaging with the positive-locking engaging opening of the support element with an engaging end cross-sectional geometry complementary to the engaging opening cross-sectional geometry of the positive-locking engaging opening of the support element.

19. An exhaust flap valve in accordance with claim 18, wherein the positive-locking engaging end of the drive shaft has an essentially cylindrical configuration in the direction of the pivot axis.

20. An exhaust flap valve in accordance with claim 15, wherein the coupling device is carried on the pivot shaft so as to be secured against detachment from the pivot shaft.

* * * * *